(12) United States Patent
Bauco (10) Patent No.: US 10,175,121 B2
(45) Date of Patent: Jan. 8, 2019

(54) LIGHT DIFFUSING FIBER THERMAL INDICATORS

(71) Applicant: Corning Incorporated, Corning, NY (US)

(72) Inventor: Anthony Sebastian Bauco, Horseheads, NY (US)

(73) Assignee: CORNING INCORPORATEd, Corning, NY (US)

( * ) Notice: Subject to any disclaimer, the term of this patent is extended or adjusted under 35 U.S.C. 154(b) by 744 days.

(21) Appl. No.: 14/692,061

(22) Filed: Apr. 21, 2015

(65) Prior Publication Data

US 2015/0316424 A1 Nov. 5, 2015

Related U.S. Application Data

(60) Provisional application No. 61/987,890, filed on May 2, 2014.

(51) Int. Cl.
*G01K 11/18* (2006.01)
*G01K 11/12* (2006.01)
(Continued)

(52) U.S. Cl.
CPC ............. *G01K 11/18* (2013.01); *G01K 11/12* (2013.01); *G01K 11/32* (2013.01); *G01K 2213/00* (2013.01); *G02B 6/001* (2013.01)

(58) Field of Classification Search
CPC ............ G01K 7/02; G01K 3/005; G01K 3/10; G01K 7/42; G01K 7/22; G01K 2205/04; G01K 2013/024; G01K 7/01; G01K 7/10; G01K 11/32; G01K 13/00; G01K 13/02; G01K 7/16; B23K 31/02; G01F 1/00; G01N 25/72; G01N 25/28; G01N 25/32; G01N 33/225; G01N 33/02; H05K 7/20945; F24F 11/0012; F24F 2001/0052; F24F 2011/0093; F24F 11/022; H02M 1/32; H02M 1/38; H02M 1/53806; H01C 7/008; H01C 1/14; H01C 17/00; H01R 4/023; H01R 4/029; H01R 43/28; G01R 31/2642; G01R 31/048; G01R 31/40; G01J 5/004;
(Continued)

(56) References Cited

U.S. PATENT DOCUMENTS 4,713,538 A 12/1987 Theocharous
5,052,820 A 10/1991 McGinniss et al.
(Continued)

FOREIGN PATENT DOCUMENTS

CN 103017936 4/2013
EP 0352676 A2 1/1990

*Primary Examiner* — Manish S Shah (57) ABSTRACT

A light diffusing fiber including one or more segments, and a thermochromic coating on at least a portion of the light diffusing fiber. The thermochromic coating is opaque at a first temperature, and is transparent at a second temperature. A system for detecting the temperature of an apparatus including the apparatus, a light diffusing fiber thermally coupled to the apparatus, and a light source optically coupled to the light diffusing fiber. A method for detecting the temperature of an apparatus including thermally coupling a light diffusing fiber to the apparatus, optically coupling a light source to the light diffusing fiber, and monitoring the light diffusing fiber for transmitted light.

8 Claims, 5 Drawing Sheets

(51) Int. Cl.
  *G01K 11/32* (2006.01)
  *F21V 8/00* (2006.01)
(58) Field of Classification Search
  CPC .... G01J 5/00; G01J 5/003; G01J 5/043; G01J 5/0821; A47J 43/287; F16B 2/02; F16B 1/00; F16B 47/00; F16B 2001/0035; F16M 13/02; F16M 13/022
  See application file for complete search history.

(56) References Cited

U.S. PATENT DOCUMENTS

| | | | |
|---|---|---|---|
| 5,547,283 A | 8/1996 | Kronberg | |
| 7,450,806 B2 | 11/2008 | Bookbinder et al. | |
| 8,092,081 B2 | 1/2012 | Hermann et al. | |
| 2012/0275178 A1* | 11/2012 | Logunov | F21V 13/02 362/552 |
| 2012/0275180 A1* | 11/2012 | Button | G02B 6/001 362/558 |
| 2013/0088888 A1* | 4/2013 | Fewkes | G02B 6/001 362/558 |

* cited by examiner

LIGHT DIFFUSING FIBER THERMAL INDICATORS

CROSS-REFERENCE TO RELATED APPLICATIONS

This application claims the benefit of priority under 35 U.S.C. § 119 of U.S. Provisional Application Ser. No. 61/987,890 filed on May 2, 2014 the contents of which are relied upon and incorporated herein by reference in their entirety.

BACKGROUND

Field

The present specification generally relates to light diffusing fibers (LDF) and, more specifically, to thermal indicators that comprise light diffusing fibers having thermochromic coatings applied thereto.

Technical Background

Thermal monitoring of apparatuses may be done with any number of devices, such as contact sensors, thermoresistors, or thermal sensors, such as bolometers. These devices are adequate when the signal from the devices can be transmitted to a computer or to an individual responsible for monitoring the thermal profile of the apparatus. However, applications exist where temperatures of apparatuses cannot be transmitted to the individual monitoring the temperature profile of the apparatus, in which the number of sensors required to monitor the temperature profile is excessive, or where the environment where the apparatus is located is not compatible with the sensors. A need exists for thermal indicators that are operational under conditions where other thermal sensors are not operational or inefficient.

SUMMARY

According to one embodiment, a light diffusing fiber comprises one or more segments, and a thermochromic coating on at least a portion of the light diffusing fiber. The thermochromic coating is opaque at a first temperature, and the thermochromic coating is transparent at a second temperature.

According to another embodiment, a system for detecting the temperature of an apparatus comprises the apparatus, a light diffusing fiber thermally coupled to the apparatus, and a light source optically coupled to the light diffusing fiber. The light diffusing fiber comprises at least two segments, and a thermochromic coating on at least a portion of the light diffusing fiber. The thermochromic coating is opaque at a first temperature, and the thermochromic coating is transparent at a second temperature.

According to another embodiment, a method for detecting the temperature of an apparatus comprises thermally coupling a light diffusing fiber to the apparatus, optically coupling a light source to the light diffusing fiber, and monitoring the light diffusing fiber for transmitted light. The light diffusing fiber comprises at least two segments, and a thermochromic coating on at least a portion of the light diffusing fiber. The thermochromic coating is opaque at a first temperature, and the thermochromic coating is transparent at a second temperature.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Reference is now made in detail to embodiments, examples of which are illustrated in the accompanying drawings. Whenever possible, like or similar reference numerals are used throughout the drawings to refer to like or similar parts. It should be understood that the embodiments disclosed herein are merely examples, each incorporating certain benefits of the disclosure that may be combined in other embodiments.

Various modifications and alterations may be made to the following examples within the scope of this disclosure, and aspects of the different embodiments may be mixed in different ways to achieve yet further embodiments. Accordingly, the true scope of this disclosure is to be understood from the entirety of the present disclosure, in view of, but not limited to, the embodiments described herein.

An "updopant" is herein considered to be a dopant which has a propensity to raise the refractive index relative to pure undoped $SiO_2$. A "downdopant" is herein considered to be a dopant which has a propensity to lower the refractive index relative to pure undoped $SiO_2$. An updopant may be present in a region of an optical fiber having a negative relative refractive index when accompanied by one or more other dopants which are not updopants. Likewise, one or more other dopants which are not updopants may be present in a region of an optical fiber having a positive relative refractive index. A downdopant may be present in a region of an optical fiber having a positive relative refractive index when accompanied by one or more other dopants which are not downdopants.

The term "nano-structured fiber region" describes the fiber having a region or area with a large number (greater than 50) of gas filled voids, or other nano-sized structures, e.g., more than 50, more than 100, or more than 200 voids in the cross-section of the fiber. The gas filled voids may contain, for example, $SO_2$, Kr, Ar, $CO_2$, $N_2$, $O_2$, or mixture thereof. The cross-sectional size (e.g., diameter) of nano-sized structures (e.g., voids) as described herein may vary from 10 nm to 1 μm (for example, 50 nm-500 nm), and the length may vary from 1 millimeter 50 meters (e.g., 2 mm to 5 meters, or 5 mm to 1 m range).

Figure 1:
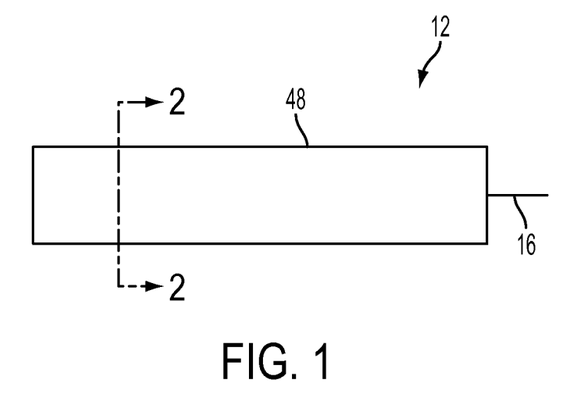
FIG. 1 is a schematic side view of a section of a light diffusing optical fiber according to one embodiment.
Figure 2A:
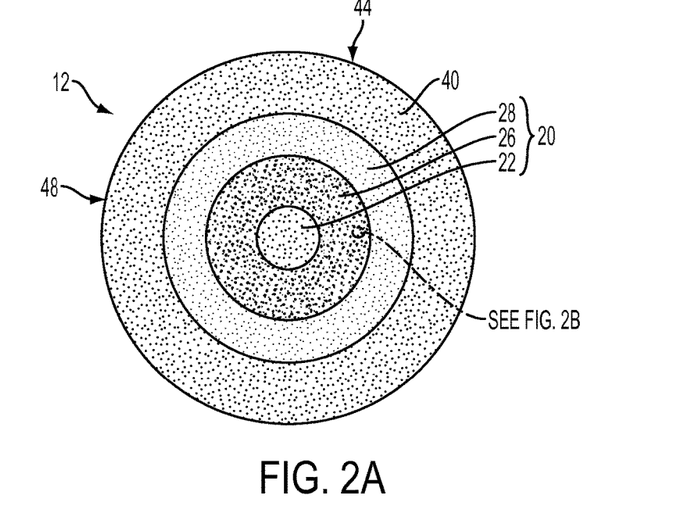
FIG. 2A is a schematic cross-section of the optical fiber of FIG. 1 as viewed along the direction 2-2.

FIG. 1 is a schematic side view of a section of a light diffusing fiber according to embodiments. The light diffusing fiber depicted in FIG. 1 has a plurality of voids in the core of the light diffusing fiber (hereinafter "LDF") 12 having a central axis ("centerline") 16. FIG. 2A is a schematic cross-section of LDF 12 as viewed along the direction 2-2 in FIG. 1. LDF 12 may be, for example, any one of various types of optical fiber with a nano-structured fiber region having periodic or non-periodic nano-sized structures 32 (for example voids). In some embodiments, fiber 12 includes a core 20 divided into three sections or regions. These core regions are: a solid central portion 22; a nano-structured ring portion (inner annular core region) 26; and an outer, solid portion 28 surrounding the inner annular core region 26. In some embodiments, a cladding region 40 ("cladding") surrounds the annular core 20 and has an outer surface.

In some embodiments of fiber 12, core sections 22 and 28 comprise silica doped with germanium. Dopants other than germanium, singly or in combination, may be employed within the core, and particularly at or near the centerline 16, of the optical fiber to obtain the desired refractive index and density. In some embodiments, the relative refractive index profile of the optical fiber is non-negative in sections 22 and 28. These dopants may be, for example, Al, Ti, P, Ge, or a combination thereof. In some embodiments, the optical fiber contains no index-decreasing dopants in the core.

Figure 2B:
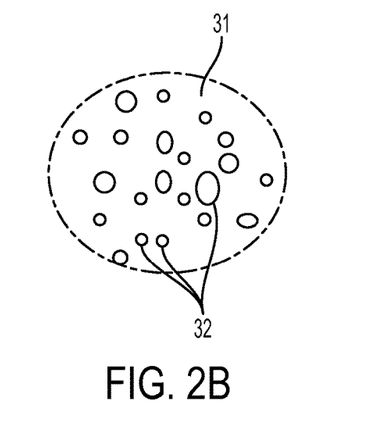
FIG. 2B is a schematic magnified view of a section of the optical fiber.

In some embodiments, the core region 26 of LDF 12 comprises a glass matrix ("glass") 31 with a plurality of non-periodically disposed nano-sized structures 32 situated therein, such as, for example, the voids shown in detail in FIG. 2B, which is a magnified view of the core region 26 of LDF 12. In other embodiments, voids 32 may be periodically disposed, such as in a photonic crystal optical fiber.

By "non-periodically disposed" or "non-periodic distribution," it is meant that when one takes a cross-section of the optical fiber (such as shown in FIG. 2A), the voids 32 are randomly or non-periodically distributed across a portion of the fiber. Thus, in such embodiments, similar cross sections taken at different points along the length of the fiber will reveal different cross-sectional void patterns, i.e., various cross sections will have different void patterns, wherein the distributions of voids and sizes of voids do not match. These voids are stretched (elongated) along the length (i.e. parallel to the longitudinal axis) of the optical fiber, but do not extend the entire length of the entire fiber for typical lengths of transmission fiber. While not being bound by theory, it is believed that the voids extend less than 10 meters, and in many cases less than 1 meter along the length of the fiber.

According to embodiments, the diameters of the voids may be greater than or equal to about 10 nm, such as greater than or equal to about 15 nm. In other embodiments, the voids may be greater than or equal to about 20 nm, such as greater than or equal to about 25 nm. In some embodiments, the diameters of the voids may be less than or equal to about 50 nm, such as less than or equal to about 45 nm. In other embodiments, the diameters of the voids may be less than or equal to about 40 nm, such as less than or equal to about 35 nm.

The LDF 12 of embodiments may be made by methods which utilize preform consolidation conditions that result in a significant amount of gases being trapped in the consolidated glass blank, thereby causing the formation of voids in the consolidated glass optical fiber preform. Rather than taking steps to remove these voids, the resultant preform is used to form an optical fiber with voids, or nano-sized structures, therein. The resultant fiber's nano-sized structures or voids are utilized to scatter or guide the light out of the fiber, via its sides, along the fiber length. That is, the light is guided away from the core 20, through the outer surface of the fiber, to provide the desired illumination. Methods of making optical fibers with nano-sized voids are described, for example, in U.S. Pat. No. 7,450,806, which is incorporated herein by reference in its entirety.

In some embodiments, cladding 40 has thickness of 20 μm or more. In embodiments, the cladding has an outer diameter of greater than or equal to about 120 μm to less than or equal to about 130 μm. In other embodiments the cladding has a diameter that is less than 120 μm, for example from greater than or equal to about 60 to less than or equal to about 80 μm. In some embodiments, the outer diameter of the cladding has a constant diameter along the length of fiber 12. By constant, it is meant that the variations in the diameter with respect to the mean value are less than 10%, such as less than 5%, or even less than 2%.

In embodiments, the uniformity of illumination along the fiber length is controlled such that the minimum scattering illumination intensity is not less than 0.7 of the maximum scattering illumination intensity, by controlling fiber tension during the draw process; or by selecting the appropriate draw tension (e.g., between 30 g and 100 g, or between 40 g and 90 g). The light diffusing optical fiber 12 has a scattering-induced attenuation greater than 50 dB/km for one or more wavelength(s) within 200 nm to 2000 nm. The fiber 12 may have a plurality of bends formed therein so as to scatter light via the nano-sized structures 32 away from the core 20 and through the outer surface within specified area(s). In embodiments, the deviation of the illumination intensity of scattered light is less than 30% of the maximum scattering illumination intensity along the length. According to some embodiments, the scattering-induced attenuation is between 100 dB/km and 6000 dB/km, or higher. In some embodiments, attenuation due to scattering of fiber 12 is 6000 dB/km to 20000 dB/km for the one or more wavelength(s) situated within 200 nm to 2000 nm. According to some embodiments fiber 12 has a length between 0.5 m and 100 m and the scattering-induced attenuation is between 300 dB/km and 5000 dB/km for the one or more wavelength(s) situated within 200 nm to 2000 nm, and/or is greater than 3 dB/length of fiber. In other embodiments, the fiber 12 has a length between 0.1 m and 0.5 m and the scattering-induced attenuation is between 5000 dB/km and 20,000 dB/km for the one or more wavelength(s) situated within 200 nm to 2000 nm. Preferably, the nano-sized structures 32 are gas filled voids (e.g., $SO_2$ filled voids) with diameter of greater than 10 nm, preferably greater than 50 nm, more preferably greater than 100 nm.

According to embodiments, fiber 12 includes a thermochromic coating 44, as shown in FIG. 2A. In embodiments, thermochromic coating 44 includes a thermochromic pigment or dye that is opaque at a first temperature, and is transparent at a second temperature. Various thermochromic pigments and dyes may be used in the coating. For example, in embodiments, the thermochromic pigment or dye may be a leuco dye or liquid crystals. In embodiments, the thermochromic pigment or dye may be one manufactured by QCR Solutions Corp.; H.W. Sands Corp.; LCR Hallcrest; Chromatic Technologies, Inc. (CTI); or Matsui International Company, Inc. The thermochromic dye may be added to a suitable plastic or polymer carrier or mixture of carriers. In embodiments, the carrier may be selected from polyethylene, polypropylene, polyvinylchloride, and acrylic polymers, such as, for example, polymers of methacrylates, polymers of methyl acrylates, polymers of ethyl acrylates, etc. The thermochromic pigment or dye may be added to the carrier in any amount that causes the thermochromic dye or pigment and carrier mixture (hereinafter referred to as the "thermochromic coating") to be opaque at a first temperature and transparent at a second temperature. It should be understood that the amount of thermochromic pigment in the thermochromic coating will vary depending on the type of thermochromic pigment or dye and the type of carrier used.

Once mixed with the carrier, the thermochromic coating 44 may be applied to the LDF 12. In embodiments, the thermochromic coating may be applied by dipping the LDF 12 into the thermochromic coating material, by spraying-coating the thermochromic coating material onto the LDF 12, by spin coating the thermochromic coating material onto the LDF 12, co-extruding the LDF 12 and the coating 44, extruding the LDF 12 into a pre-formed coating, or by any type of physical application, such as painting. After the thermochromic coating material is applied to the LDF 12, the thermochromic coating material may be cured, such as by heating, exposing the thermochromic coating to radiation, or drying the thermochromic coating material at ambient conditions. According to embodiments, the thermochromic coating 44 covers the radial surfaces of the LDF 12, but the LDF 12 is coated or cut so that the cross-sectional ends of the LDF 12, such as those shown in FIG. 2A, are exposed.

In embodiments, the thickness of the LDF 12, including the thermochromic coating 44, may be from greater than or equal to about 150 µm to less than or equal to about 350 µm, such as from greater than or equal to about 175 µm to less than or equal to about 325 µm. In other embodiments, the thickness of the LDF 12 may be from greater than or equal to about 200 µm to less than or equal to about 300 µm, such as from greater than or equal to about 225 µm to less than or equal to about 275 µm. In yet other embodiments, the thickness of the LDF 12 may be about 250 µm. In embodiments, the thermochromic coating 44 may have a thickness of from greater than or equal to about 30 µm to less than or equal to about 70 µm, such as from greater than or equal to about 35 µm to less than or equal to about 65 µm. In other embodiments, the thermochromic coating 44 may have a thickness of from greater than or equal to about 40 µm to less than or equal to about 60 µm, such as from greater than or equal to about 45 µm to less than or equal to about 55 µm. In yet other embodiments, the thickness of the thermochromic coating 44 may be about 50 µm.

In embodiments, the thermochromic coating is opaque at temperatures less than or equal to a transition temperature of the thermochromic coating, and the thermochromic coating is transparent at temperatures greater than the transition temperature. In other embodiments, the thermochromic coating is opaque at temperatures greater than a transition temperature of the thermochromic coating, and the thermochromic coating is transparent at temperatures less than or equal to the transition temperature.

In embodiments, the LDF 12 with the thermochromic coating 44 applied thereto (hereinafter referred to as "thermochromic coated LDF") comprises segments. As used herein "segments" are discrete portions of the thermochromic coated LDF that transition from opaque to transparent, or vice versa, when the temperature of the thermochromic coating transitions from a temperature that is below a transition temperature of the thermochromic pigment or dye to a temperature that is above the transition temperature of the thermochromic pigment or dye. There is no specific length for any given heat source. Rather, the length of any segment will correspond to a heat source that it is in contact with. For example, the thermochromic coated LDF may be 10 meters long and opaque at ambient conditions. A heat source having a temperature above the transition temperature of the thermochromic coating may be applied to 2 centimeters of the thermochromic coated LDF causing the 2 centimeters of the thermochromic coated LDF where the heat source is applied to transition from opaque to transparent. Although not being restricted to any particular theory, it is believe that because the LDF 12 and the thermochromic coating 44 are very thin and because the LDF 12 and the thermochromic coating 44 are made from materials that are not good thermal conductors, the transition of the thermochromic coating 44 from opaque to transparent is restricted to the 2 centimeters at which the heat source is present. It is believed that because of the physical dimensions and the low thermal conductivity of the LDF 12 and the thermochromic coating 44 the segment of the LDF that transitions from opaque to transparent is relatively the same length as the heat source.

In embodiments, each segment in the thermochromic coated LDF may be opaque or transparent depending on the temperature of the thermochromic coated LDF. Thus, in embodiments, a first set of segments of the thermochromic LDF may be transparent where the temperature of the first set of segments are greater than a transition temperature, and a second set of segments of the thermochromic coated LDF may be opaque where the temperature of the second set of segments is less than or equal to the transition temperature. In other embodiments, a first set of segments of the thermochromic LDF may be transparent where the temperature of the first set of segments is less than a transition temperature, and a second set of segments of the thermochromic coated LDF may be opaque where the temperature of the second set of segments is greater than or equal to the transition temperature.

Figure 3:
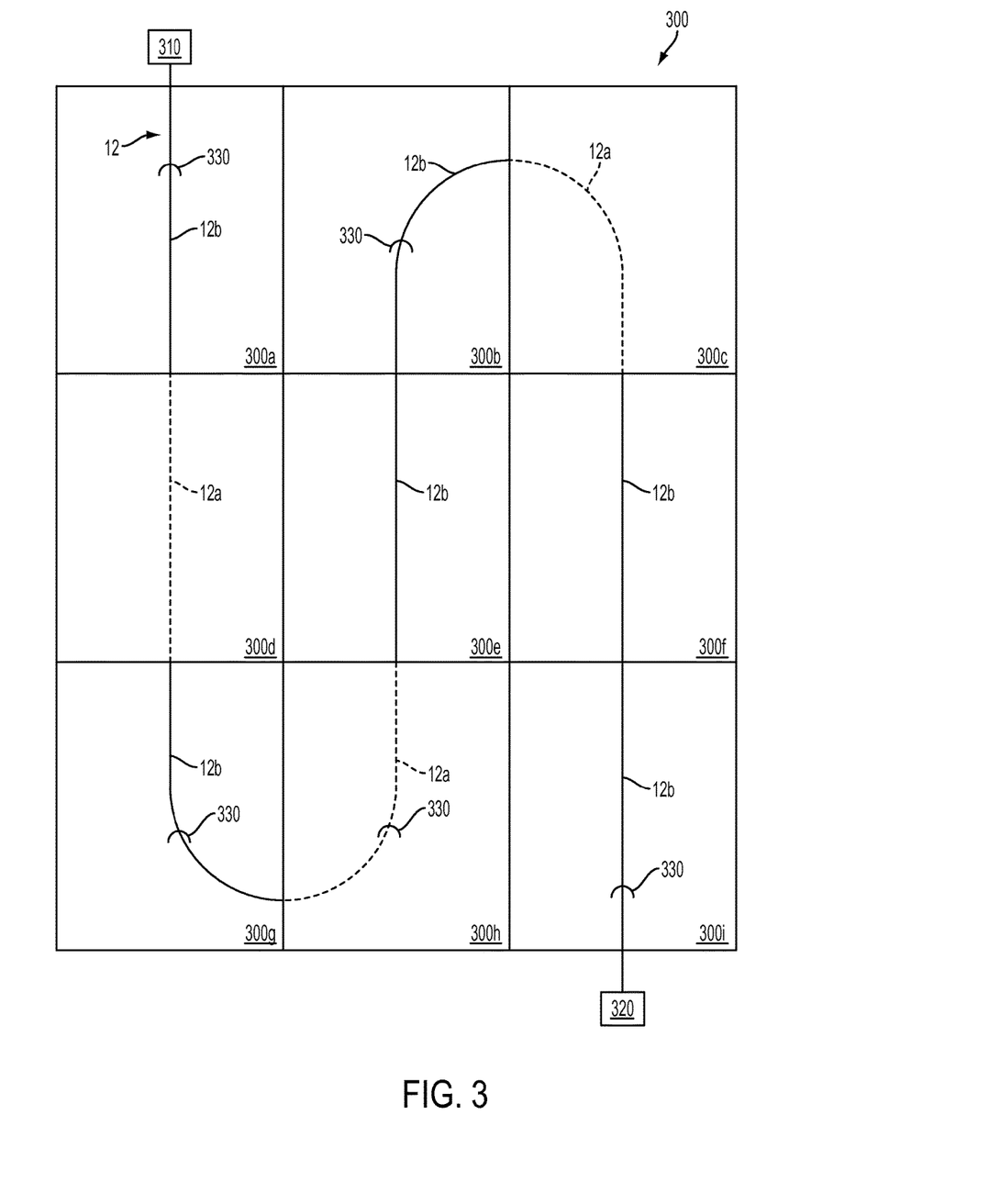
FIG. 3 is a schematic of a system including a light diffusing optical fiber according to one embodiment.

Referring to FIG. 3, embodiments also include a system for detecting a temperature of an apparatus 300. Embodiments of the system include: (a) an apparatus 300; (b) a thermochromic coated LDF 12 thermally coupled to the apparatus 300; and (c) a light source 310 optically coupled to the thermochromic LDF 12.

In embodiments, the type of apparatus 300 is not limited and may be any apparatus for which it is desirable to monitor the temperature. For example, the apparatus may be computer components, such as servers, process equipment, such as heat exchangers or reaction chambers. It should be understood that the temperature of any apparatus may be monitored according to embodiments of the system.

In embodiments, the thermochromic coated LDF 12 may be thermally coupled to the apparatus 300 by any adhesive (not shown) that is not thermally insulating. For example, the temperature of the adhesive should be the same or about the same as the temperature of the apparatus 300 to which the thermochromic coated LDF 12 is coupled. Exemplary adhesives include thermal epoxies and copper tape. The adhesive is applied to either or both of the apparatus 300 and/or the thermochromic LDF 12 and is positioned between the apparatus 300 and the thermochromic LDF 12 to thermally couple the apparatus 300 and the thermochromic LDF 12. In other embodiments, the thermochromic LDF 12 may be thermally coupled to the apparatus 300 by the use of mechanical fasteners 330 located at various positions along the thermochromic coated LDF 12 in such a way as to maintain physical contact between the apparatus 300 and the entire length of the thermochromic coated LDF 12, and to keep a constant tension in the thermochromic LDF 12. In embodiments using mechanical fasteners 330, the number, location, and dimensions of the mechanical fasteners 330 may be selected so that the mechanical fasteners 330 cover as little surface area of the thermochromic LDF as possible. Exemplary mechanical fasteners include staples, U-shaped nails, or conduit fasteners.

In some embodiments, the thermochromic coated LDF 12 is optically coupled to a light source 310 by physically connecting the thermochromic coated LDF 12 directly to the light source 310. In other embodiments, a light transmission device may be used to optically couple the thermochromic LDF 12 and the light source 310. In other embodiments, the system comprises two light sources 310, 320, and a first end of the thermochromic coated LDF 12 is optically coupled to the first light source 310, and a second end of the thermochromic coated LDF 12 is optically coupled to the second light source 320.

Figure 4:
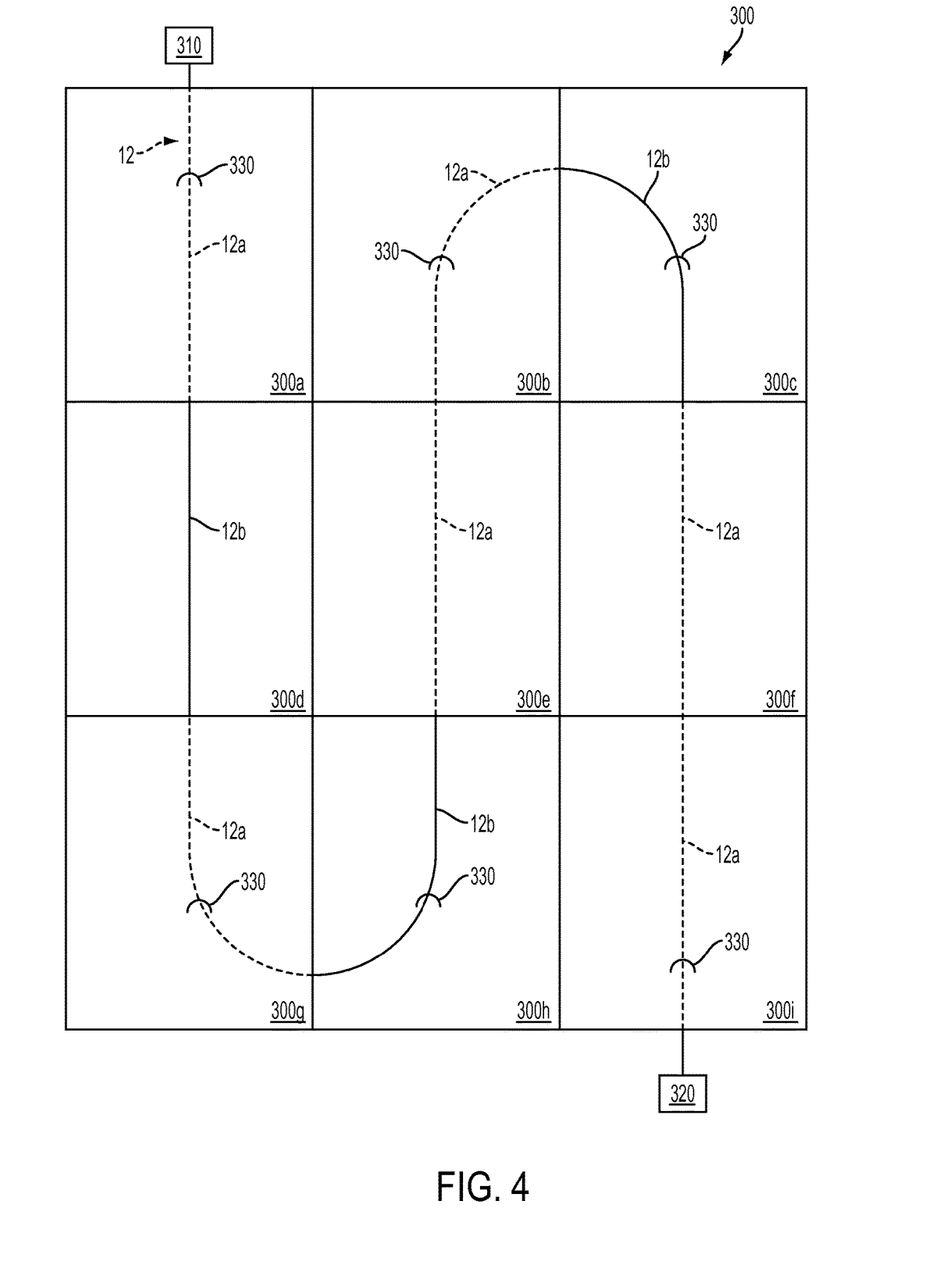
FIG. 4 is a schematic of a system including a light diffusing optical fiber according to one embodiment.

As described above, and in reference to FIG. 2A, the thermochromic LDF 12 is configured to scatter light via the nano-sized structures 32 away from the core 20 and through the outer surface 48 to form a light-source fiber that transmits substantially uniform light radiation over its length. Accordingly, in embodiments, the thermochromic coated LDF 12, which is optically coupled to the light source(s) 310, 320, transmits light when the thermochromic coating 44 is in its transparent state and does not transmit light when the thermochromic coating 44 is in its opaque state. Thus, in embodiments, and with reference again to FIG. 3, the system for detecting a temperature of an apparatus 300 includes a thermochromic coated LDF 12 that transmits light (depicted by dashed lines in the figures) when the thermochromic coated LDF 12 is at a first temperature, and the thermochromic coated LDF 12 does not transmit light (depicted by solid lines in the figures) when the thermochromic coated LDF 12 is at a second temperature. In some embodiments, segments of the thermochromic coated LDF 12 are thermally coupled to different portions 300a-300i of the apparatus 300, and a first set of segments 12a of the thermochromic coated LDF 12 thermally coupled to portions of the apparatus having a temperature greater than a transition temperature 300c, 300d, and 300h transmit light, and a second set of segments 12b of the thermochromic coated LDF 12 thermally coupled to portions of the apparatus having a temperature less than or equal to the transition temperature 300a, 300b, 300e, 300f, 300g, and 300i do not transmit light. In other embodiments, and with reference to FIG. 4, a first set of segments 12a of the thermochromic coated LDF 12 thermally coupled to portions of the apparatus having a temperature less than a transition temperature 300a, 300b, 300e, 300f, 300g, and 300i transmit light, and a second set of segments 12b of the thermochromic coated LDF 12 thermally coupled to portions of the apparatus having a temperature greater than or equal to the first temperature 300c, 300d, and 300h do not transmit light. It should be understood that the number of segments in a set of segments that transmit light and the number of segments in a set of segments that do not transmit light are not limited, and that each set of segments may include 1 segment or more than one segment.

Figure 5:
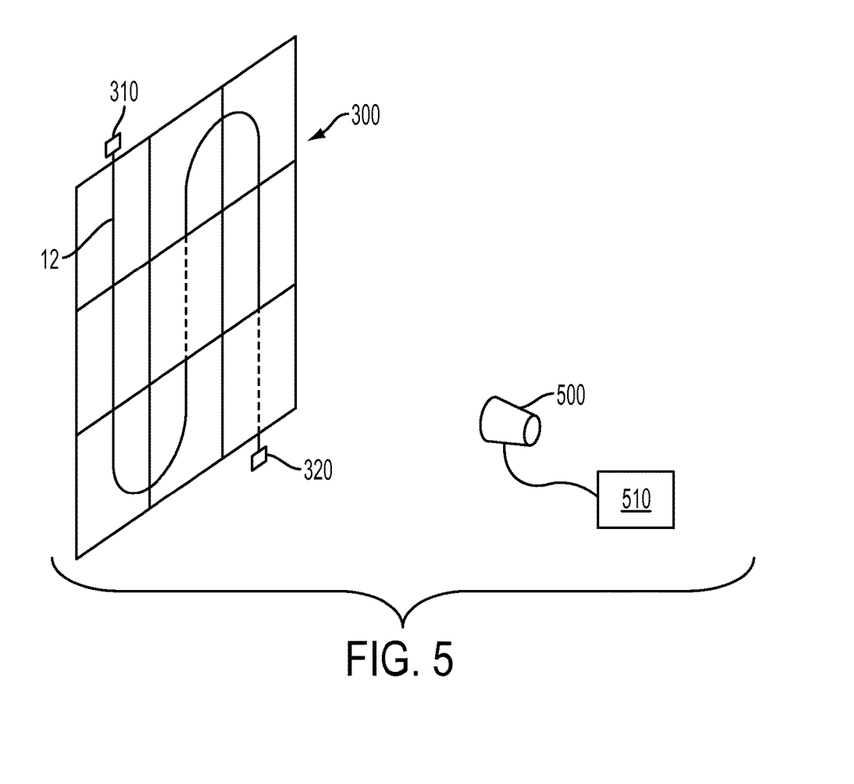
FIG. 5 is a schematic of a system including a light diffusing optical fiber and a photodetector according to one embodiment.

According to embodiments, and with reference to FIG. 5, the temperature of one or more portions of the apparatus 300 may be observed by monitoring whether one or more segment of the thermochromic coated LDF 12 is transmitting light. In some embodiments, the observation of the thermochromic coated LDF may be accomplished by a person visually observing the thermochromic coated LDF 12 that is thermally coupled to an apparatus 300. In such embodiments, the thermochromic coated LDF 12 may transmit light having a wavelength within the visible region, such as from greater than or equal to about 400 nm to less than or equal to about 700 nm. In other embodiments, the thermochromic coated LDF 12 may transmit light having a wavelength from greater than or equal to about 500 nm to less than or equal to about 600 nm, such as from greater than or equal to about 525 nm to less than or equal to about 575 nm. In yet other embodiments, the thermochromic coated LDF 12 may transmit light having a wavelength of about 550 nm.

In other embodiments, a photodetector 500 may be used to monitor whether the thermochromic coated LDF 12 is transmitting light. In some embodiments, two or more photodetectors may be used to monitor whether the thermochromic coated LDF 12 is transmitting light. In embodiments where one or more photodetector 500 is used to monitor whether the thermochromic coated LDF 12 is transmitting light, the one or more photodetectors 500 may be connected to a computer or alarm device 510 that activates when light is detected. In embodiments, the one or more photodetectors 500 may be configured to activate an alarm when a certain wavelength of light is transmitted from the thermochromic coated LDF 12 and observed by the one or more photodetectors 500. In such embodiments, the thermochromic coated LDF 12 may transmit light having a wavelength from greater than or equal to about 350 nm to less than or equal to about 3000 nm, such as from greater than or equal to about 400 nm to less than or equal to about 2000 nm.

In embodiments, a plurality of light diffusing fibers may be bundled together in at least one of a ribbon, ribbon stack, or a round bundle. In some embodiments, the fiber bundles or ribbons (i.e., collections of multiple fibers) may be arranged in the shape of the light source in order to increase coupling efficiency. A typical bundle/ribbon structure may include, for example 2 to 36 light diffusing fibers, or, with overstacking of fibers, may include up to several hundreds of fibers. According to embodiments, a thermochromic coating may be disposed on the outer surface of the fiber ribbon. One advantage derived from the ribbon structure is that winding of the individual fibers may not be necessary, because the ribbons may form bent structures such as waves, helices, or spirals thereby allowing light to scatter into desired areas. Furthermore, the use of multi-fiber ribbons affords the possibility of having large stacks of ribbons. Such ribbon stacks would provide a more concentrated amount of light, and also open the possibility to the use of different light sources, such as red lasers, sunlight, light emitting diodes, or guidance of point light sources. For example, according to one embodiment, a plurality of light diffusing optical fibers may be optically coupled to either a single light source or a plurality of light sources, while the light diffusing optical fibers are bundled together in at least one of a ribbon, ribbon stack, or a round bundle. Furthermore the bundles or ribbons of light diffusing fibers may be connected to a light source(s) by a transmission fiber capable of directing the light towards the light diffusing fiber with a minimum of loss.

Other embodiments include a method for detecting the temperature of an apparatus. Embodiments of this method comprise thermally coupling a thermochromic coated LDF 12 to an apparatus 300, optically coupling a light source(s) 310, 320 to the thermochromic coated LDF 12, and monitoring the thermochromic coated LDF 12 for transmitted light. Methods according to embodiments may also include thermally coupling segments of the thermochromic coated LDF 12 to different portions 300a-300i of the apparatus 300 so that temperatures of different portions 300a-300i of the apparatus 300 may be monitored. In some embodiments, the thermochromic coated LDF 12 may be monitored for transmitted light by one or more photodetectors 500. According to some embodiments, the one or more photodetectors 500 may be configured to activate an alarm when transmitted light is detected from the thermochromic LDF 12. In some embodiments, the one or more photodetectors 500 may be configured to detect particular wavelengths of light transmitted from the thermochromic coated LDF 12. In such embodiments, the thermochromic coated LDF 12 may transmit light having a wavelength from greater than or equal to about 350 nm to less than or equal to about 3000 nm, such as from greater than or equal to about 400 nm to less than or equal to about 2000 nm.

According to embodiments of the method, and with reference to FIG. 3, it may be determined whether the temperature of portions 300a-300i of the apparatus 300 are above or below a transition temperature by configuring the thermochromic coated LDF 12 so that segments 12a of the thermochromic coated LDF 12 transmit light (depicted by dashed lines in the figures) when the temperature of the portions 300c, 300d, and 300h of the apparatus 300 to which the segment is thermally coupled is greater than a transition temperature, and so that segments 12b of the thermochromic coated LDF 12 do not transmit light (depicted by solid lines in the figures) when the temperature of the portions 300a, 300b, 300e, 300f, 300g, and 300i of the apparatus 300 to which the segment is thermally coupled is less than or equal to the transition temperature. In other embodiments, and with reference to FIG. 4, it may be determined whether the temperature of portions 300a-300i of the apparatus 300 are above or below a transition temperature by configuring the thermochromic coated LDF 12 so that segments 12a of the thermochromic coated LDF 12 transmit light when the temperature of the portions 300a, 300b, 300e, 300f, 300g, and 300i of the apparatus 300 to which the segment is thermally coupled is less than a transition temperature, and configured so that segments 12b of the thermochromic coated LDF 12 do not transmit light when the temperature of the portions 300c, 300d, and 300h of the apparatus 300 to which the segment is thermally coupled is greater than or equal to the transition temperature.

Methods and thermal indicators according to embodiments hereinabove allow the temperature of various portions of an apparatus to be monitored with a single thermochromic coated LDF. Further, no wires, or other modes for transmitting a temperature reading to the end user are needed and, thus, thermal indicators as disclosed herein may be placed into locations with small clearances that may not allow conventional temperature monitoring apparatus to be used. In addition, thermal indicators disclosed hereinabove may be placed in environments that are not conducive to conventional temperature monitoring devices, such as caustic chemical or radioactive environments.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A light diffusing fiber comprising:
 nano-sized structures or voids that guide the light out of sides of the light diffusing fiber along a length of the light diffusing fiber;
 one or more segments; and
 a thermochromic coating on at least a portion of the light diffusing fiber, wherein
 the thermochromic coating is opaque at a first temperature, and the thermochromic coating is transparent at a second temperature.

2. The light diffusing fiber of claim 1, wherein the first temperature is a transition temperature, and
 the thermochromic coating is opaque at temperatures less than or equal to the transition temperature, and the thermochromic coating is transparent at temperatures greater than the transition temperature.

3. The light diffusing fiber of claim 2, wherein the light diffusing fiber comprises more than one segment and is configured so that the thermochromic coating is transparent at at least a first segment where a temperature of the first segment is greater than the transition temperature, and the thermochromic coating is opaque at at least a second segment where a temperature of the second segment is less than or equal to the transition temperature.

4. The light diffusing fiber of claim 1, wherein the first temperature is a transition temperature, and
 the thermochromic coating is opaque at temperatures greater than or equal to the transition temperature, and the thermochromic coating is transparent at temperatures less than the transition temperature.

5. The light diffusing fiber of claim 4, wherein the light diffusing fiber comprises more than one segment and is configured so that the thermochromic coating is transparent at at least a first segment where a temperature of the first segment is less than the transition temperature, and the thermochromic coating is opaque at at least a second segment where a temperature of the light diffusing fiber is greater than or equal to the transition temperature.

6. The light diffusing fiber of claim 1, wherein light diffusing fiber has a scattering-induced attenuation greater than 50 dB/km for one or more wavelength(s) within 200 nm to 2000 nm.

7. The light diffusing of claim 1, wherein the thermochromic coating comprises a carrier selected from the group consisting of polyethylene, polypropylene, polyvinylchloride, and acrylic polymers.

8. The light diffusing fiber of claim 1, wherein a thickness of the thermochromic coating is from greater than or equal to about 30 μm to less than or equal to about 70 μm.

* * * * *

UNITED STATES PATENT AND TRADEMARK OFFICE
CERTIFICATE OF CORRECTION

PATENT NO. : 10,175,121 B2
APPLICATION NO. : 14/692061
DATED : January 8, 2019
INVENTOR(S) : Anthony Sebastian Bauco It is certified that error appears in the above-identified patent and that said Letters Patent is hereby corrected as shown below:

On the Title Page

In Column 1, item (73), Assignee, Line 1, delete "INCORPORATEd," and insert -- INCORPORATED, --, therefor.

In the Claims

In Column 10, Line 51, Claim 7, after "diffusing" insert -- fiber --, therefor.

Signed and Sealed this
Twelfth Day of November, 2019

Andrei Iancu
*Director of the United States Patent and Trademark Office*